United States Patent
Dharia et al.

(10) Patent No.: US 12,084,620 B2
(45) Date of Patent: Sep. 10, 2024

(54) MAXIMUM OLEFINS PRODUCTION UTILIZING MULTI-STAGE CATALYST REACTION AND REGENERATION

(71) Applicant: Technip Process Technology, Inc., Houston, TX (US)

(72) Inventors: Dilip Dharia, Sugarland, TX (US); Raj Kanwar Singh, Houston, TX (US); Harvey McQuiston, Dallas, TX (US)

(73) Assignee: T.EN Process Technology, Inc, Houston, TX (US)

( * ) Notice: Subject to any disclaimer, the term of this patent is extended or adjusted under 35 U.S.C. 154(b) by 0 days.

(21) Appl. No.: 17/210,164

(22) Filed: Mar. 23, 2021

(65) Prior Publication Data

US 2021/0207039 A1   Jul. 8, 2021

Related U.S. Application Data

(62) Division of application No. 15/969,128, filed on May 2, 2018, now Pat. No. 10,954,453.

(51) Int. Cl.
*C10G 11/18* (2006.01)
*B01J 8/28* (2006.01)

(52) U.S. Cl.
CPC .............. *C10G 11/182* (2013.01); *B01J 8/28* (2013.01); *B01J 2208/00752* (2013.01); *B01J 2208/00761* (2013.01); *C10G 2400/20* (2013.01); *C10G 2400/22* (2013.01)

(58) Field of Classification Search
CPC .............. C10G 11/182; C10G 2400/20; C10G 2400/22; B01J 8/28; B01J 2208/00752; B01J 2208/00761; B01J 8/26
See application file for complete search history.

(56) References Cited

U.S. PATENT DOCUMENTS

| | | |
|---|---|---|
| 2,767,126 A | 10/1956 | Rice |
| 3,856,659 A | 12/1974 | Owen |
| 3,879,281 A | 4/1975 | Jones et al. |
| 3,963,603 A | 6/1976 | Bunn, Jr. et al. |
| 4,064,039 A | 12/1977 | Penick |
| 4,194,965 A | 3/1980 | Billings et al. |

(Continued)

FOREIGN PATENT DOCUMENTS

| | | |
|---|---|---|
| JP | H06-322377 A | 11/1994 |
| WO | 2017068599 A1 | 4/2017 |

OTHER PUBLICATIONS

International Search Report and Written Opinion dated Aug. 27, 2019 issued in International Application No. PCT/US19/30400.

(Continued)

*Primary Examiner* — Thuan D Dang
(74) *Attorney, Agent, or Firm* — Locke Lord LLP; Gabrielle L. Gelozin; Christopher J. Capelli (57) ABSTRACT

A method and system for increasing olefin production and quality from a hydrocarbon feed comprising a fully integrated multi-stage catalyst regeneration zones with multi-stage reaction zones in series and/or parallel. The multi-stage regeneration with at least one partial and one full burn zone provides an independent control to achieve the lowest possible regenerated catalyst temperature, resulting in highest possible catalyst to oil ratio required to maximize olefins yields through increased catalytic cracking in a multi stage FCC riser/risers.

20 Claims, 8 Drawing Sheets

(56) References Cited

U.S. PATENT DOCUMENTS

| | | | |
|---|---|---|---|
| 4,332,674 A | | 6/1982 | Dean et al. |
| 4,344,926 A | | 8/1982 | Petty et al. |
| 4,428,822 A | | 1/1984 | Jones |
| 4,786,400 A | | 11/1988 | Farnsworth |
| 4,980,053 A | | 12/1990 | Li et al. |
| 5,447,622 A | * | 9/1995 | Kerby .................. C10G 11/18 |
| | | | 585/312 |
| 5,565,176 A | | 10/1996 | Johnson et al. |
| 5,670,037 A | | 9/1997 | Zaiting et al. |
| 6,224,833 B1 | | 5/2001 | Rall |
| 6,503,460 B1 | | 1/2003 | Miller et al. |
| 7,479,218 B2 | | 1/2009 | Letzsch |
| 7,491,315 B2 | | 2/2009 | Eng et al. |
| 8,491,781 B2 | | 7/2013 | Gauthier et al. |
| 2008/0035527 A1 | | 2/2008 | Eng et al. |
| 2010/0224534 A1 | | 9/2010 | Couch et al. |
| 2011/0110825 A1 | | 5/2011 | Leonard et al. |
| 2011/0178347 A1 | | 7/2011 | Feugnet |
| 2013/0130889 A1 | | 5/2013 | Gbordzoe et al. |
| 2016/0214911 A1 | | 7/2016 | Eng |
| 2018/0223193 A1 | | 8/2018 | Kukade et al. |

OTHER PUBLICATIONS

Extended European Search Report dated Dec. 16, 2021, issued during the prosecution of European Patent Application No. EP 19796220.2, 11 pages.

Notice of Reasons for Refusal from the Japanese Patent Office, dated Apr. 17, 2023, issued during the prosecution of the corresponding Japanese Patent Application No. 2020-561685.

* cited by examiner

MAXIMUM OLEFINS PRODUCTION UTILIZING MULTI-STAGE CATALYST REACTION AND REGENERATION

CROSS-REFERENCE TO RELATED APPLICATION

This application is a divisional application of U.S. patent application Ser. No. 15/969,128 filed on May 2, 2018, the contents of which are incorporated herein by reference in their entirety.

FIELD OF THE INVENTION

The embodiments disclosed herein relate to catalytic cracking reactor systems and processes, such as the Fluid Catalytic Cracking (FCC) process. More particularly, the embodiments disclosed herein provide improved fluidized catalytic cracking process utilizing a multi-stage, preferably two-stage, catalyst regeneration process in which the catalyst circulation is independently controlled to adjust catalyst to oil (C/O) ratio as desired for cracking hydrocarbon feedstocks to maximize olefin production.

BACKGROUND OF THE INVENTION

It is common commercial practice to produce gasoline, heating oil and diesel fuel by cracking heavier petroleum fractions. One of the major commercial techniques for accomplishing this conversion is fluid catalytic cracking (FCC). In FCC, a feed petroleum fraction such as vacuum gas oil, heavy atmospheric gas oil, etc., is contacted with particles of hot, active catalyst at high temperatures and low pressures of about 1 to 5 atmospheres absolute in the absence of added hydrogen. The catalyst should be in sufficient quantity and at a sufficient temperature to vaporize the oil feed, raise the oil feed to a cracking temperature of about 900° F. to 1100° F. and supply the endothermic heat of reaction. The oil and catalyst flow together (concurrently) for a time sufficient to carry out the intended conversion. During the conversion of the heavy petroleum fraction to lighter fractions, coke is laid down on the catalyst particles thereby deactivating them. These deactivated catalyst particles are separated from the cracked petroleum product, stripped of volatile hydrocarbons and transported to a separate regenerator. In the regenerator, the coked catalyst is combined with an oxygen containing gas, e.g., air, whereby coke is burned off the catalyst and the catalyst is both reactivated and heated. The heated, reactivated catalyst is then returned into riser and mixed further with fresh oil feed, thus completing the cycle. Typical FCC processes are described in greater detail in U.S. Pat. Nos. 4,064,039; 4,344,926; 4,194,965; 3,963,603; 4,428,822; and 3,879,281, incorporated herein by reference in their entirety.

Exemplary prior art fluidized catalytic cracking processes include U.S. Pat. No. 4,332,674 to Dean et al., which discloses a unit consisting of one riser reactor, a catalyst stripper and a multi-stage regenerator. The regenerator is a two-stage regenerator in series where the spent catalyst particles are passed, successively, to first and second (relatively lower and higher temperature) catalyst regeneration zones. Once the catalyst completes its cycle through the regenerator as described herein above, the fully regenerated catalyst is withdrawn from the second stage regenerator and charged to the riser reactor at a desired elevated temperature and in an amount sufficient to result in substantially complete vaporization of the hydrocarbon feed. The vaporized hydrocarbon feed upon contact with hot fully regenerated catalyst undergoes a catalytic cracking, while proceeding upward in the riser reactor. Once both vaporized catalytically cracked hydrocarbon products and the spent catalyst reach the stripper vessel, the spent catalyst is removed from the cracked products, directed to a stripper zone for removal of volatiles and then directed to the bottom section of the regenerator, thereby completing the FCC unit cycle.

The U.S. Pat. No. 4,332,674 process provides a CO enriched flue gas that is recovered from the low temperature first stage regenerator and $CO_2$ enriched flue gas with excess oxygen is recovered from the higher temperature second stage regenerator. Both the flue gas streams are discharged from the regenerators in parallel and do not mix in either regenerators. Rejection of CO enriched flue gas from the first stage regenerator provides low regenerator temperature in both first and second stage regenerator. Notably, the lowest regenerator temperature leads to highest possible catalyst to oil ratio required to crack heavier feedstocks. Whereas, higher regenerator temperature will lead to low catalyst circulation, high catalyst deactivation and negative impact on the overall yields.

U.S. Pat. No. 6,503,460 to Miller et al. discloses staging catalyst combustion zones in a single regenerator vessel using baffles. As stated in the patent, baffles can be used to achieve partial combustion zone above the baffles and full combustion zone below within the same catalyst bed. However, U.S. Pat. No. 6,503,460 provides no configuration wherein the catalyst from the two different combustion zones within the regenerator can be utilized to feed multiple riser reactors to maximize olefins.

Other prior art FCC processes employ a single catalyst regeneration zone and two reaction zones in series, for example, a riser cracking reaction zone followed by a bed cracking reaction zone. The fully regenerated catalyst from a single stage regenerator enters the lower portion of the riser reactor and cracks the oil feed to produce products, e.g., rich in gasoline. These products leave the riser reactor top and enter the catalyst bed reaction zone supported by the reactor cone and a stripper section below. The products from the riser reactor undergo further cracking in the bed cracking reaction zone as they exits the riser reactor top resulting in further breakdown of gasoline rich products further to lighter olefins. This process produces greater than 40% LPG, out of which approximately 20% is propylene. This process requires high catalyst to oil ratio, e.g., up to 12, high severity operation, i.e. reactor outlet temperature ranging from 1025° F. to 1150° F. and high steam consumption to reduce the partial pressure of the hydrocarbon feed. U.S. Pat. No. 4,980,053, discloses a similar process.

However, the technology disclosed in, for example, U.S. Pat. No. 4,980,053, is limited to processing light feedstocks such as Vacuum gas oil. The light feedstocks provide less coke yield which results in a reasonable regenerator temperature in between 1250° F. and 1350° F., when coke is burned in a single stage full burn mode regenerator. Further, the process requires high catalyst circulation rate at the desired reaction temperature to maximize the olefins yield, which may not be achievable as there is no independent control on the catalyst circulation through the system. The catalyst circulation is tied up with regenerator temperature, which further tied up the coke yield in the riser and coke burn in the regenerator. Heavier feedstocks such as residual oils, and the like, provide high coke yield resulting in higher regenerator temperature when coke is burned in a single stage regenerator. The high regenerator temperature limits catalyst circulation impacting the product yield, and also results in catalyst deactivation.

U.S. Pat. No. 8,491,781 to Gauthier et al. discloses a process with fully regenerated catalyst from a same regenerator unit that is fed into two separate riser reactors operating in parallel. The two riser reactors comprise of a principal riser reactor for cracking a heavy hydrocarbon cut, typically residual oil and the other additional secondary riser reactor or additional riser reactors are employed to crack one or more light feed constituted by a light gasoline ($C_5$—150° C.) to maximize propylene yield. The secondary riser reactor operates at a high severity than the principal riser reactor for the catalytic cracking of gasoline to propylene. The feed to the secondary riser reactor generally contains a significant quantity of long chain olefins, generally with 5 carbon atoms or more, derived from gasoline produced by cracking heavy feeds by FCC or from a $C_{4+}$ olefins oligomerization unit or from any other process producing long chain olefins.

However, in the U.S. Pat. No. 8,491,781 process both riser reactors are fed with a stream of catalyst from the same regeneration zone, i.e. fully regenerated catalyst. The catalyst circulation is set based on individual riser reactor's outlet temperature and a common regenerator temperature. If additional circulation is required only in the secondary riser reactor at a constant riser outlet temperature, it cannot be increased without affecting the main principal riser reactor because of a common regenerator serving catalyst to both the risers. The only way to increase catalyst circulation to the secondary riser reactor is by increasing the riser severity, i.e. operating at higher outlet temperature which leads to high dry gas production.

In view of the above, it is therefore an object of the present invention to provide an integrated system where multi-stage catalyst regeneration system is coupled with multi-stage reaction system to enhance catalytic cracking of gas oils or residual oils or mixtures to maximize olefins. More particularly, it is an object of this invention to provide such processes with flexibility to produce more olefins, specifically propylene. The disclosed process independently controls and adjusts catalyst circulation utilizing two stages of the catalyst regeneration process. At least one regeneration stage provides a partial burn and one stage provides a full burn resulting in a controlled lowest regenerator temperature in both the partial and the full burn regeneration through rejection of CO enriched flue gas from the partial burn regeneration process.

Additional objects of the present invention will become apparent from the following summary and detailed discussion of preferred embodiments of this invention.

SUMMARY OF THE INVENTION

According to an embodiment, an improved method for increasing olefin production from a hydrocarbon feed utilizing multi-stage catalyst regeneration is disclosed. The method comprises: a) delivering from a multi-stage catalyst regenerator a partially-regenerated catalyst from at least one catalyst partial regeneration zone to a secondary riser reactor and a fully-regenerated catalyst from at least one catalyst full regeneration zone to a primary riser reactor; b) cracking the hydrocarbon feed in a first reaction zone of the primary riser reactor to produce a first cracked product including olefins and spent catalyst and passing the first cracked product and spent catalyst to a bed cracking reaction zone in a reactor vessel to produce a second cracked product; c) separating the first and second cracked products from the spent catalyst in the reactor vessel; d) recovering the first and second cracked products including olefins and separating an uncracked bottoms and a partially cracked product(s) from the cracked products; e) cracking a recycle feed comprising at least one of the uncracked bottoms, partially cracked, and cracked products of step (d), in the secondary riser reactor to produce a third cracked product and additional spent catalyst; f) separating and recovering the third cracked product comprising olefins from the additional spent catalyst and delivering the additional spent catalyst to the reactor vessel; and g) passing the spent catalyst from the reactor vessel to the multi-stage catalyst regenerator comprising the catalyst partial regeneration zone and the catalyst full regeneration zone, wherein the spent catalyst is partially regenerated to provide the partially-regenerated catalyst and a portion of the partially-regenerated catalyst is delivered to the catalyst full regeneration zone to provide fully regenerated catalyst.

According to another embodiment a method for increasing olefin production from a hydrocarbon feed in a two-stage reaction vessel utilizing multi-stage catalyst regeneration is disclosed. The method comprises: a) delivering from a multi-stage catalyst regenerator a fully-regenerated catalyst from at least one catalyst full regeneration zone to a primary riser reactor; b) cracking the hydrocarbon feed in the primary riser reactor to produce a first cracked product, and spent catalyst; c) further cracking the first cracked product in a bed cracking reaction zone atop the primary riser reactor to produce a second cracked product including olefins; d) separating the first cracked product and the second cracked product including olefins from the spent catalyst in a reactor vessel comprising the bed cracking reaction zone; e) recovering the first cracked product and second cracked product including olefins; and f) passing the spent catalyst from the reactor vessel to the multi-stage catalyst regenerator comprising the at least one catalyst full regeneration zone and at least one catalyst partial regeneration zone, wherein the spent catalyst is partially regenerated in the catalyst partial regeneration zone to provide partially-regenerated catalyst and forwarding the partially-regenerated catalyst to the catalyst full regeneration zone to provide fully regenerated catalyst.

The method for catalyst regeneration in multi stages, i.e., two or more stages, in series with a partial burn in the first stage provides the lowest regenerated catalyst temperature through rejection of carbon monoxide (CO) enriched flue gas from the first-stage regenerator, resulting in highest possible catalyst to oil ratio required to maximize olefins. The method provides catalyst flow from a first to a second or consecutive zone in series, however air inlet and flue gas discharge is in parallel preferably to maximize the production of CO in the partial burn zone and minimize regenerated catalyst temperature. However, air inlet and flue gas discharge can be in series, if needed to add flexibility. The partial burn first stage regeneration operates in an oxygen deficient environment requiring less air and additionally less air is required in the second regeneration zone because less coke is transferred from first to the second-stage regeneration zones and thus, there is an overall reduction in the amount of air required to burn the coke from the catalyst.

The method accommodates heavier feedstocks with high coke yields that can be easily handled with two-stage regeneration utilizing partial burn combustion mode in the first regeneration zone followed by full burn combustion mode in the second regeneration zone. The degree of coke burn in each regeneration zone can be independently controlled, which further controls the regenerator's temperature and can be used to adjust the catalyst circulation as required.

This embodiment provides the flexibility to process all types of feedstocks ranging from light to heavy feed The embodiments disclosed herein provide for reduced size of the second-stage regenerator and its internals. Thus, further reducing the equipment costs. Combining fully and partially regenerated catalyst feed to a secondary riser optimizes the secondary riser operation to a full extent.

BRIEF DESCRIPTION OF THE DRAWINGS

Various embodiments of the overall invention are shown by way of example in the attached Figures, wherein.

DESCRIPTION OF THE INVENTION

The use of the disclosed multi-stage catalyst regeneration process makes it possible for simultaneous selective processing of high and low boiling components contained in gas oils and residual oils. In the first stage of the presently disclosed regeneration process, catalyst particles, which have hydrocarbonaceous materials such as coke deposited on them, are regenerated under conditions of certain oxygen concentration and temperature ranging from 1150° F. to 1300° F. selected to particularly burn hydrogen associated with hydrocarbonaceous material. These conditions result in a residual level of carbon left on the catalyst and the production of a carbon monoxide (CO) rich flue gas. This relatively mild regeneration serves to limit local catalyst hot spots in the presence of steam formed during hydrogen combustion so that the formed steam will not substantially reduce the catalyst activity. A partially-regenerated catalyst substantially free of hydrogen in the remaining coke and comprising residual carbon is thus recovered from the this catalyst regeneration stage and passed to a second stage higher temperature regenerator where the remaining carbon is substantially completely burned to $CO_2$ at an elevated temperature up to 1400° F. This second stage regeneration is conducted under conditions and in the presence of sufficient oxygen to burn substantially all residual carbon deposits and to produce $CO_2$-rich fluid gas.

The regenerated catalyst is withdrawn from the second stage and charged to the riser reactor at a desired elevated temperature and in an amount sufficient to result in substantially complete vaporization of the hydrocarbon feed. The catalyst particles are typically at a temperature ranging from about 1300° F. to about 1400° F., such that when the hot catalyst comes in contact with the hydrocarbon feed, it is vaporized rapidly followed by subsequent catalytic cracking of the feed.

Figure 1:
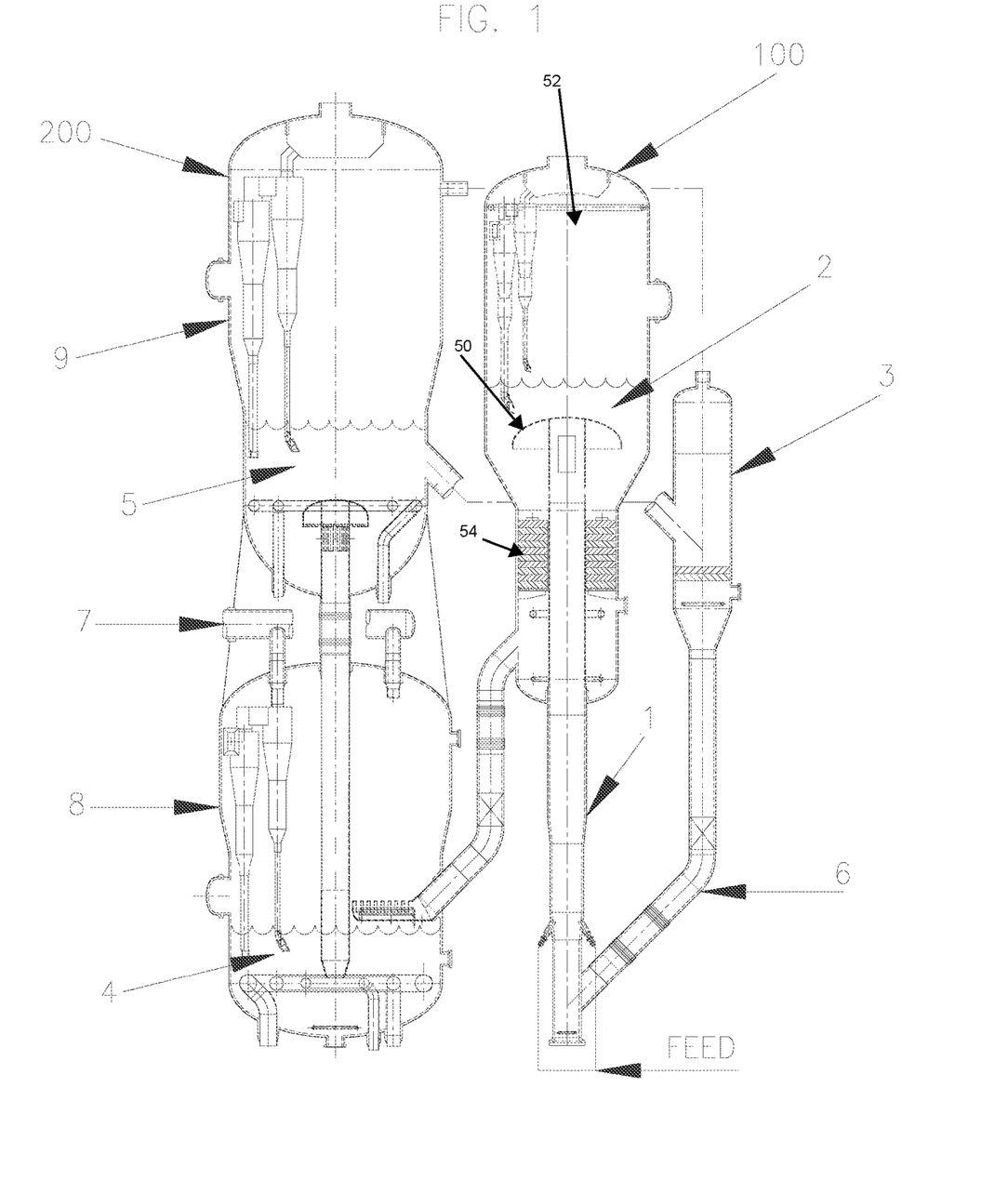
FIG. 1 is a schematic representation of a fluidized catalytic cracking apparatus that includes two-stage catalyst regeneration in series integrated with a riser reactor that provides a first stage reaction zone in the riser and a second stage bed cracking reaction zone.

According to the embodiment of FIG. 1, a method of cracking a hydrocarbon feed, such as, for example a resid or heavier feedstocks utilizing two-stage regeneration of the catalyst in a multi-stage catalyst regenerator (200), e.g., two regenerator vessels in series. The method operates the first stage regenerator (8) in a partial burn combustion mode to provide a catalyst partial regeneration zone (4), followed by a full burn combustion mode in a catalyst full regeneration zone (5), in a second stage regenerator (9). The first and second regenerators (8, 9) presented in FIG. 1 are integrated in series. However, the regenerators can be utilized in a parallel fashion, which is not shown in FIG. 1. The partial burn regeneration in the first stage regenerator (8) operates in an oxygen deficient environment burning only a portion, typically 50% to 80% of the coke on the catalyst and all the entrained hydrocarbons from the stripper at low regenerator temperatures, ranging from 1150° F. to 1300° F. to minimize hydrothermal deactivation of the catalyst. The carbon on regenerated catalyst "CRC" for partial burn zone catalyst is typically around 0.3 to 0.9 wt %. The partially-regenerated catalyst from the catalyst partial regeneration zone (4) of the first stage regenerator (8) is then transferred to the catalyst full regeneration zone (5) in the second stage regenerator (9) typically through an internal lift line riser between the two regenerators (8, 9), as shown in FIG. 1, or through external transfer lines. The catalyst is almost completely regenerated in the second stage regenerator (9) operating at about 1300° F. to about 1400° F., in full burn mode with excess oxygen. The carbon on regenerated catalyst "CRC" for full burn zone catalyst is typically around 0.01 to 0.1 wt %. The two-stage reaction zone comprises a primary or first riser reactor (1) that receives fully regenerated catalyst (6) from a pipe or conduit in fluid communication with a withdraw well (3). The primary riser reactor (1) provides a first stage reaction zone and a second stage reaction zone. The second stage reaction zone comprises a bed cracking reaction zone (2) atop the riser reactor (1) in a reactor vessel (100). The reactor vessel (100) can be, for example a single reactor vessel in which the primary riser reactor's (1) first stage reaction zone is in fluid communication with the bed cracking reaction zone (2) within the reactor vessel (100) through distributor (50), as presented in FIG. 1. The bed cracking reaction zone (2) utilizes a bed temperatures about 840° F. to about 1100° F.

According to the embodiments of FIG. 1 fully regenerated catalyst with the lowest possible temperature is provided through the rejection of carbon monoxide (CO) enriched flue gas port (7) from the catalyst partial regeneration zone (4) in first stage regenerator (8). This ensures the highest possible catalyst circulation from the regenerator for a given riser outlet temperature to maintain same riser heat of cracking requirement, thereby increasing catalyst to oil ratio which further increases catalytic cracking to maximize olefin yields The method provides further increase in propylene and LPG yields from the existing known deep catalytic cracking (DCC) technology, which essentially provides riser plus bed cracking. The increased catalyst circulation leads to increased conversion, propylene yield and Naphtha to LPG conversion due to increased catalytic reaction.

The claimed method can process various types of feedstocks ranging from light to heavy feed including recycle streams whereas conventional DCC technology, however, is limited to process light feedstocks only.

Figure 2:
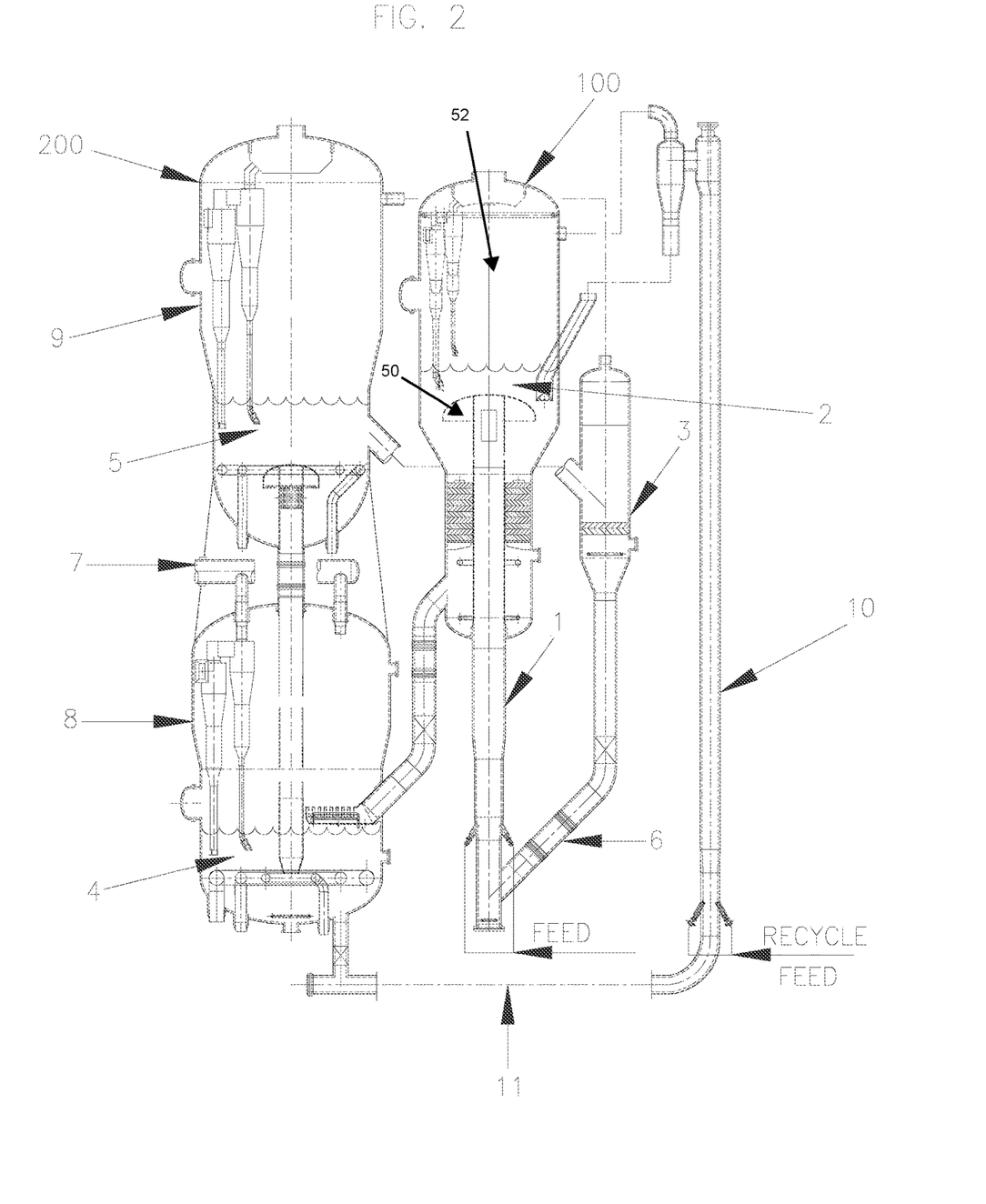
FIG. 2 is a schematic representation of a fluidized catalytic cracking apparatus that includes two-stage catalyst regeneration in series integrated with dual riser technology, i.e., a primary and secondary riser reactor, wherein a primary riser reactor provides a first stage reaction zone in the riser and a second stage bed cracking reaction zone, and partially regenerated catalyst is added to the secondary riser reactor.

FIG. 2 provides an embodiment, utilizing two-stage regeneration in a multi-stage catalyst regenerator (200), e.g., two regenerator vessels in series, integrated with riser reactors and multiple reaction zones in series and parallel, wherein fully regenerated catalyst (6) from catalyst full regeneration zone (5) in the second stage regenerator (9) is fed into a primary riser reactor (1) comprising two-stage reaction zones in series. In this embodiment partially regenerated catalyst (11) from the catalyst partial regeneration zone (4) of the first stage regenerator (8) is fed into a second or secondary riser reactor (10). The catalyst feed to the two risers operating in parallel are from two separate catalyst regenerators (8, 9), allowing for independent control of the catalyst circulation to the primary and secondary riser reactors (1, 10). The primary riser reactor (1) provides a first-stage reaction zone and a second-stage reaction zone comprising a bed cracking reaction zone (2) atop the riser reactor (1) in the single reactor vessel (100). The reactor vessel (100) can be, for example, a single reactor vessel in which the primary riser reactor's (1) first stage reaction zone is in fluid communication with the bed cracking reaction zone (2) within the reactor vessel (100), as presented in FIG. 2. The bed cracking reaction zone (2) utilizes bed temperatures of about 840° F. to about 1100° F. According to the embodiments presented in FIG. 2 the primary riser reactor (1) processes preferably heavier feedstock. Partially-regenerated catalyst (11) from the catalyst partial regeneration zone (4) in the first-stage regenerator (8) is fed into the secondary riser reactor (10), which processes preferably lighter feedstocks and or recycle streams, e.g. uncracked bottoms and partially cracked product streams. The partially cracked product streams include products that have the potential to be reacted or cracked further, such as, for example, gasoline to propylene.

The feed streams to the primary and secondary risers (1, 10) can be switched, if needed to add more flexibility to attain certain product specifications. Depending upon the feedstocks, catalyst stream to the primary and secondary risers reactors (1, 10) can be reversed, i.e. partially regenerated catalyst to primary riser reactor (1) and fully regenerated catalyst to secondary riser reactor (10). In this embodiment product vapors from the primary riser reactor's (1) reaction zone undergo further reaction the second reaction zone comprising a bed cracking reaction zone (2) atop riser reactor (1) in single reactor vessel (100), for example, to convert naphtha vapors from the primary riser reactor's (1) reaction zone to propylene enriched LPG.

The vapor residence time in the first riser reactor (1) is typically around 1 to 5 seconds, and more preferably around 2 seconds. The catalyst bed level in bed cracking reaction zone (2) is maintained to receive vapor weight hourly space velocity of around 1 to 10 hr-1 to achieve conversion of naphtha enriched riser vapors to propylene enriched product stream.

The claimed process utilizing the primary riser reactor (1), which provides a first-stage reaction zone and a second-stage reaction zone comprising a bed cracking reaction zone (2) atop the riser reactor (1) requires a reactor pressure ranging from about 10 psig to 20 psig, preferably 12.5 psig-15 psig and uses steam in riser that is approximately 20-30 wt. % of the feed. By contrast conventional fluidized catalytic cracking apparatus typically operates at a reactor pressure of about 25 psig-40 psig and utilize steam in riser that is approximately 7-8 wt. % of the feed. The spent catalyst from the reactor vessel (100) can be provided through a stripper section (54) and to the multi-stage catalyst regenerator (200) comprising the at least one catalyst full regeneration zone and at least one catalyst partial-regeneration zone.

According to an embodiment the catalyst partial regeneration zone (4) is operated at a temperature that is lower than the catalyst full regeneration zone (5). Thus, the cooler catalyst from the catalyst partial regeneration zone (4) to the second riser reactor (10) provides an even higher catalyst to oil ratio for a given reactor outlet temperature (ROT). Further, the degree of partial regeneration of the catalyst in the catalyst partial regeneration zone (4) can be independently controlled, which further controls the catalyst partial regeneration zone's (4) temperature and can be used to increase or decrease the catalyst circulation to the second riser reactor (10).

The second riser reactor (10) utilizes FCC catalyst to supply heat to the reaction. Appropriate catalysts for use secondary riser reactor include, for example, ZSM-5, which provides for the conversion of naphtha to propylene. ZSM-5's use as a fluid catalytic cracking additive is found to carry very little delta coke and requires very little regeneration. Operating the secondary riser reactor on partially regenerated catalyst from 1st stage regenerator is more efficient.

The presently claimed methods and apparatus optimize separate catalyst feeds from two catalyst regenerators to parallel riser reactors that provides independent control of catalyst circulation to the riser reactors. Further, the inventive process decreases load on the lift line, i.e. transfer line connecting the first stage regenerator (8) to the second stage regenerator (9). As such, a portion of the partially regenerated catalyst (11) from the catalyst partial regeneration zone (4) in the first-stage regenerator (8) is fed into the second riser reactor (10) and the rest of the partially regenerated catalyst in the catalyst partial regeneration zone (4) in the first-stage regenerator (8) is transferred to the catalyst full regeneration zone (5) in the second stage regenerator (9) for full combustion and full regeneration of the catalyst.

Figure 3:
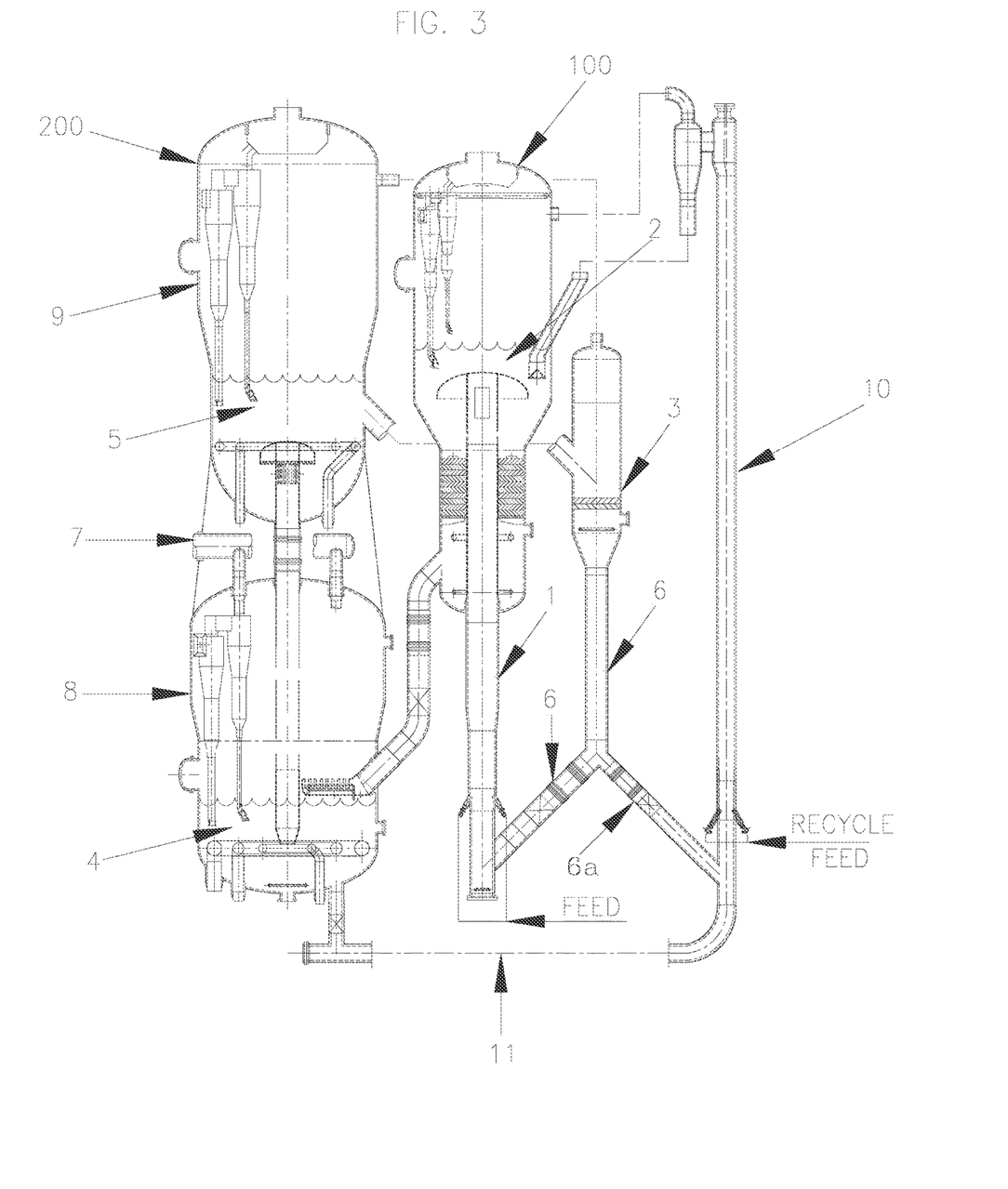
FIG. 3 is a schematic representation of a fluidized catalytic cracking apparatus that includes two-stage catalyst regeneration in series integrated with dual riser technology, i.e., a primary and secondary riser reactor, wherein primary riser reactor provides a first stage reaction zone and a second stage bed cracking reaction zone, and fully regenerated catalyst and partially regenerated catalyst are added to the secondary riser reactor.

According to another embodiment as presented in FIG. 3 fully regenerated catalyst (6) from the catalyst full regeneration zone (5) in the second stage regenerator (9) is fed into a primary riser reactor (1), via withdraw well (3). The primary riser reactor (1) contains two-stage reaction zone comprising the primary riser reactor (1) that provides a first stage reaction zone and a second stage bed cracking reaction zone (2) atop riser reactor (1) in single reactor vessel (100).

According to this embodiment the principal riser processes heavier feedstock, and partially regenerated catalyst (11) from catalyst partial regeneration zone (4) in first-stage regenerator (8) as well as fully regenerated catalyst (6a) is fed into a secondary riser reactor (10), i.e., second riser reactor (10). The secondary riser reactor (10) preferably processes lighter feedstocks and/or recycle streams. Depending upon the feedstocks, catalyst stream to the principal and secondary risers can be reversed, i.e. partially and fully regenerated catalyst to principal riser and fully regenerated catalyst to secondary riser. The embodiments of FIG. 3 provides fully regenerated catalyst (6) to first riser reactor (1) and fully and partially regenerated catalyst (6a, and 11) to the second riser reactor (10). Adding a proportion of fully and partially regenerated catalyst (6a, and 11) to the second riser reactor (10) provides the flexibility to vary delta coke on catalyst i.e., the difference between coke on spent catalyst (at stripper outlet) and coke on regenerated catalyst, expressed as a weight percent of catalyst, required to optimize heat balance and cracking potential for second riser reactor (10) operation In FIG. 2 and FIG. 3, it should be noted that vapors from secondary riser (10) can terminate either into (not shown, see e.g., FIG. 4) and undergo further reaction in a second stage bed cracking reaction zone (2) above the first stage reaction, or above the bed cracking reaction zone (2) in a dilute phase 52, as shown.

In the prior art FCC two-stage regeneration processes all the catalyst from the first stage regeneration is transferred to the second-stage regeneration. In the presently disclosed methods less air is required in the second stage regenerator (9) because less coke is transferred from first stage regenerator (8) to the second stage regenerator (9), and there is an overall reduction in air required to burn the coke. The inventive methods provide for a reduction in the size of the second stage regenerator (9) and its internals reducing equipment costs. Combining fully and partially regenerated catalyst streams (6a, and 11) to second riser reactor (10) optimizes the secondary riser reactor (10) operation to a full extent.

Figure 4:
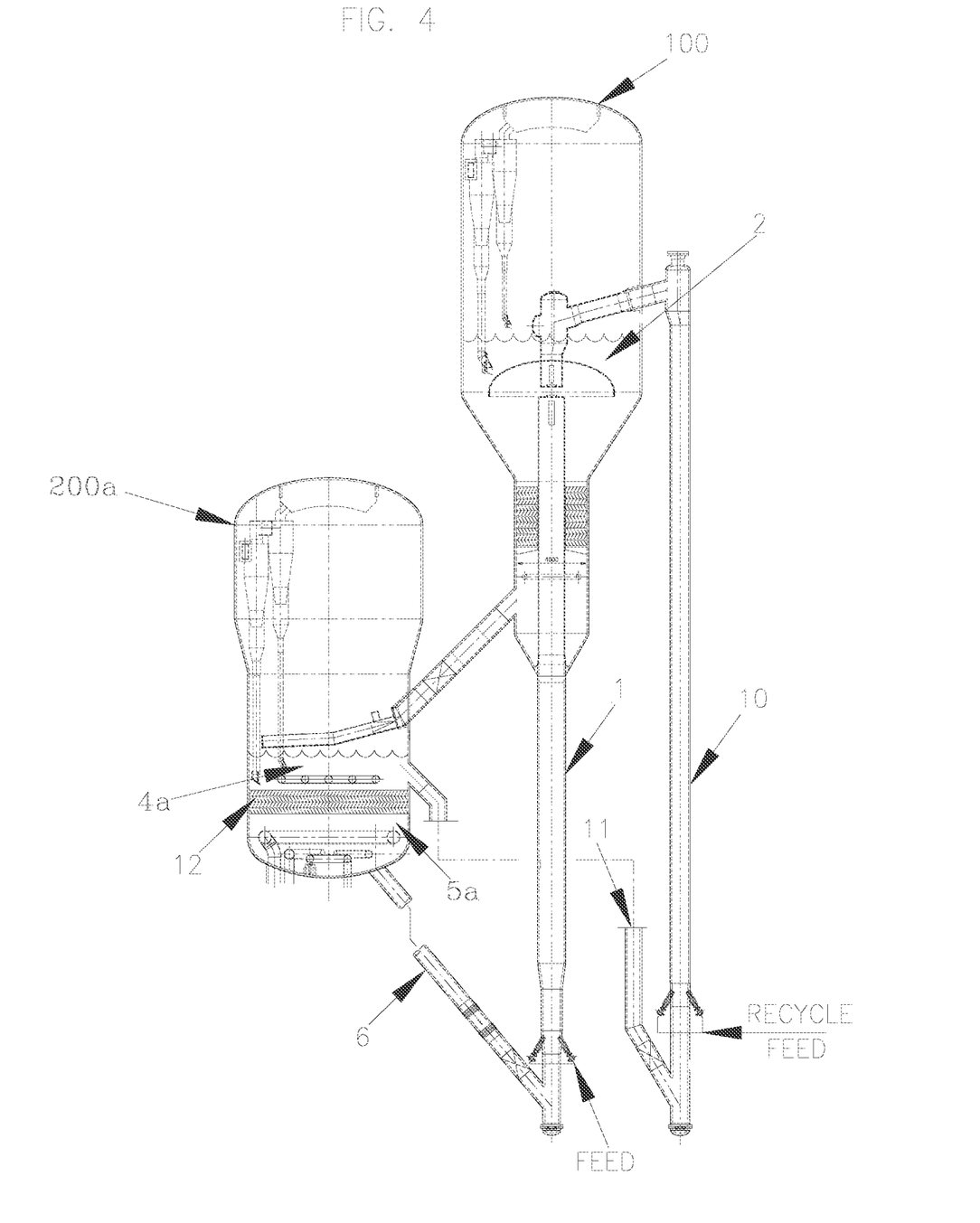
FIG. 4 is a schematic representation of a fluidized catalytic cracking apparatus that includes two-stage catalyst regeneration having a single regenerator vessel comprising two catalyst regeneration zones. The apparatus includes dual riser technology, i.e., a primary and secondary riser reactor, wherein the primary riser reactor provides a first stage reaction zone and a second stage bed cracking reaction zone and the secondary riser is in fluid communication with the bed cracking reaction zone of the primary riser reactor.
Figure 5:
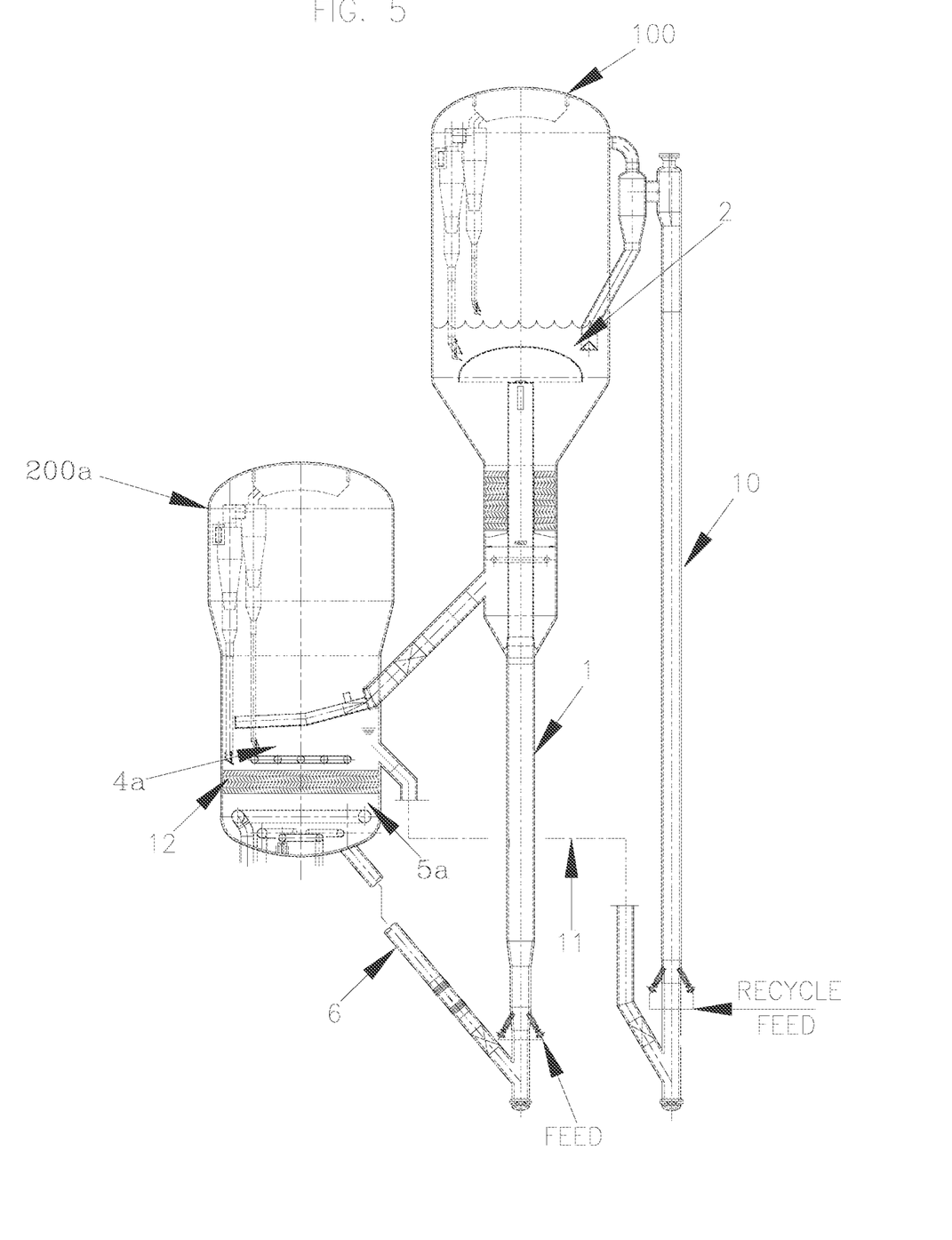
FIG. 5 is a schematic representation of a fluidized catalytic cracking apparatus that includes two-stage catalyst regeneration having a single regenerator vessel comprising two catalyst regeneration zones. The apparatus includes dual riser technology, i.e., a primary and secondary riser reactor, wherein the primary riser reactor provides a first stage reaction zone and a second stage bed cracking reaction zone.

In FIG. 4 and FIG. 5 the multi stage catalyst regenerator is incorporated into a single regenerator vessel (200a) and the catalyst feed to a first or primary riser reactor (1) and a second or secondary riser reactor (10) are from the catalyst partial regeneration zone(s) and catalyst full regeneration zone(s) that lie within the single regenerator vessel (200a). Internals/packing (12), such as structured packing as shown in FIGS. 4 and 5 can be used to achieve catalyst partial regeneration zone (4a) above the packing (12) and catalyst full regeneration zone (5a) below the packing (12). In the single regenerator vessel (200a) packing (12) separates the catalyst bed into an upper catalyst partial regeneration zone or partially regenerated catalyst zone (4a) and a lower catalyst full regeneration zone or fully regenerated catalyst zone (5a), and reduces back mixing to achieve $O_2$ enriched environment in the lower fully regenerated catalyst zone (5a) section, as well as an $O_2$ deficient environment in the upper partially regenerated catalyst zone (4a). The upper zone temperature will be lower due to colder stream of spent catalyst added to the upper zone and due to partial combustion, i.e. incomplete CO combustion. Injection of low temperature air or oxygen or mixture of air and oxygen above the packing (12) will reduce the effect of hot flue gas coming from the lower section. The low temperature partially regenerated catalyst in an upper catalyst partial regeneration zone (4a) provides high catalyst circulation in the second riser (10). As such, the catalyst partial regeneration zone (4a) operating in partial burn mode is always at lower temperature than the catalyst full regeneration zone (5a). Feeding partially-regenerated catalyst (11) to second riser reactor (10) provides higher catalyst circulation, which is required to crack lighter feedstock and maximize propylene and LPG yields. If necessary, the single regenerator vessel's (200a) conditions can be changed to provide the catalyst full regeneration zone or fully regenerated catalyst zone (5a) above the packing and the catalyst partial regeneration zone (4a) to be placed below the packing.

FIG. 4 and FIG. 5 present two different embodiments as an example of how vapors from secondary riser (10) can terminate either into or above the bed cracking reaction zone (2). In FIG. 5 the product vapors from the secondary riser reactor (10) do not undergo further reaction in a second stage bed cracking reaction zone (2) above the first stage reaction zone According the embodiment presented in FIG. 4 fully-regenerated catalyst (6) from the lower catalyst full regeneration zone (5a) section of the single regenerator vessel (200a) below the packing/internals (12) is fed into the primary riser reactor (1) for the processing of medium to heavier feedstock. Partially regenerated catalyst (11) from the upper catalyst partial regeneration zone (4a) in the top section of the single regenerator vessel (200a) above the packing/internals (12) is fed into the secondary riser reactor (10) for the processing of lighter feedstocks and/or recycle streams.

According to the embodiment presented in FIG. 4 catalyst streams from the single regenerator vessel (200a) utilizing separate regeneration zones within the single regenerator vessel (200a) are fed to parallel riser reactors, i.e., first or primary riser reactor (1) and second or secondary riser reactor (10). Depending upon the feedstocks, catalyst stream to the riser reactors (1) and (10) can be reversed, e.g., partially-regenerated catalyst (11) to primary riser reactor (1) and fully-regenerated catalyst (6) to secondary riser reactor (10). According to this embodiment product vapors from the primary riser reactor (1) undergo further reaction in a second stage bed cracking reaction zone (2) in single reactor vessel (100) above the first stage reaction zone of riser reactor (1) the products from secondary riser (10) terminate into the bed cracking reaction zone (2) to maximize olefin yields.

Similar to the embodiments of FIG. 3 utilization of the single regeneration vessel (200a) as presented in FIGS. 4 and 5 can be adapted to feed partially and fully regenerated catalyst to the secondary riser (10) and fully regenerated catalyst to the principal riser reactor (1), as well as, fully and partially regenerated catalyst to the primary riser reactor (1) and fully regenerated catalyst to secondary riser (10).

The embodiments of FIG. 4 and FIG. 5 are beneficial to process light to heavier, preferably medium feedstocks to further maximize olefins and reduce regenerator air utilization, reduce size and lower cost.

Figure 6A:
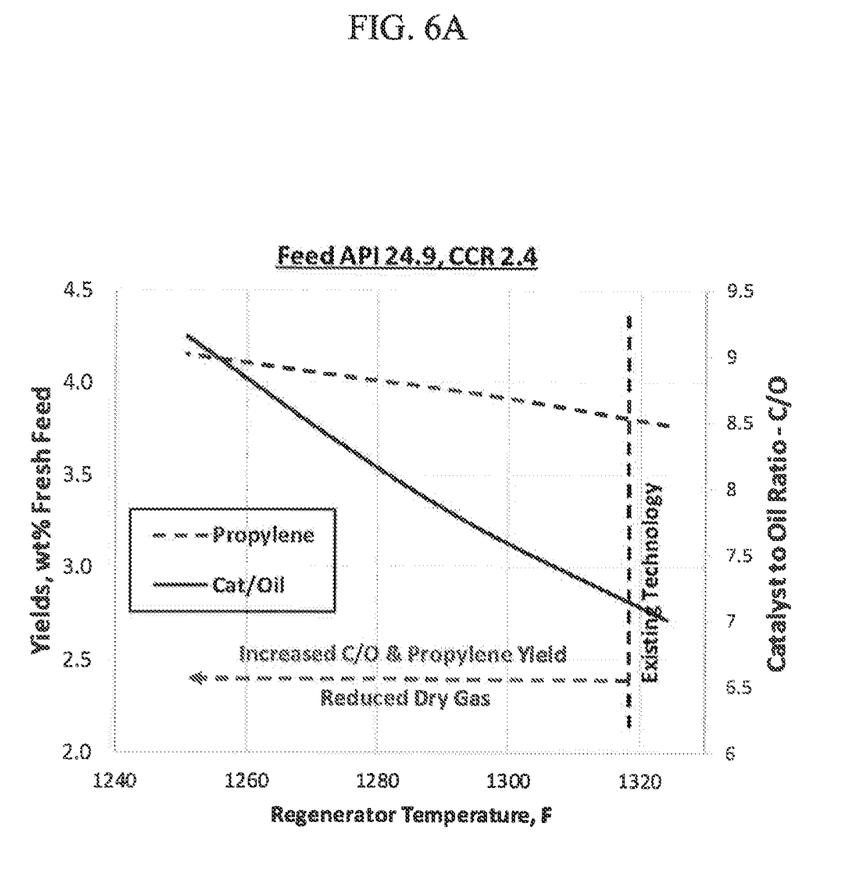
FIG. 6A, is a graphic illustration of the effect of regenerator temperature on Catalyst/Oil ratio and propylene yield for a feed having an API of 24.9 and a CCR of 2.4.
Figure 6B:
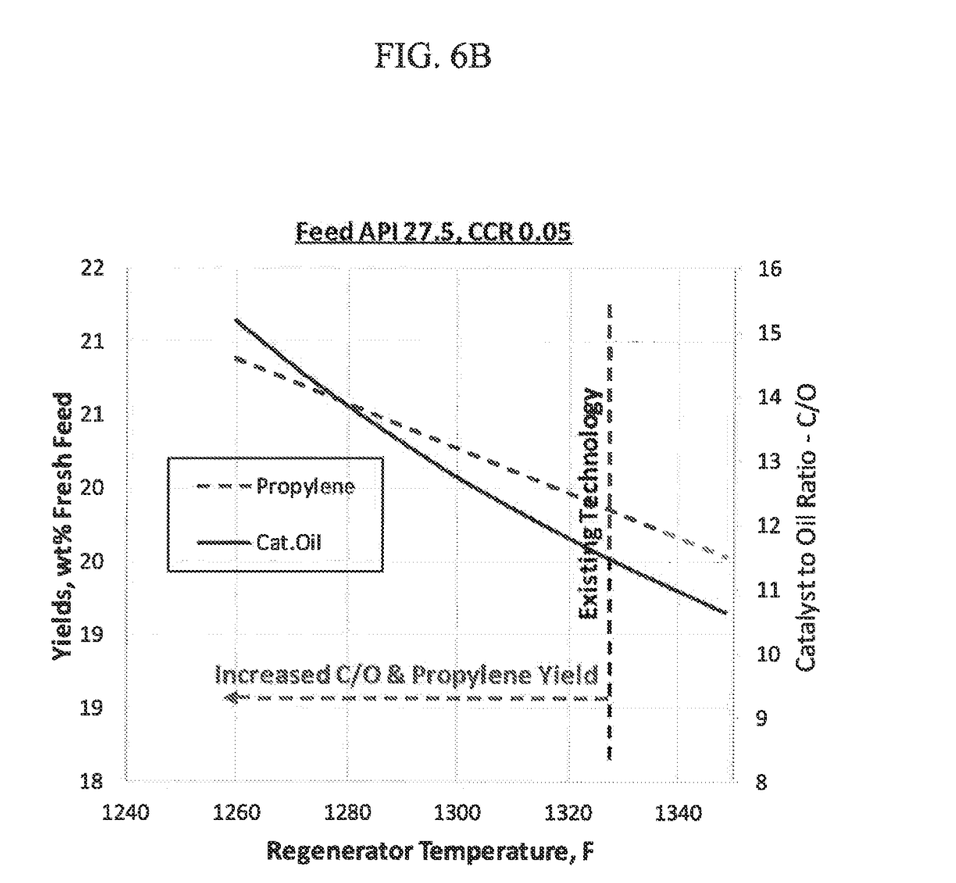
FIG. 6B, is a graphic illustration of the effect of regenerator temperature on Catalyst/Oil ratio and propylene yield for feed having an API of 27.5 and a CCR of 0.05.
Figure 6C:
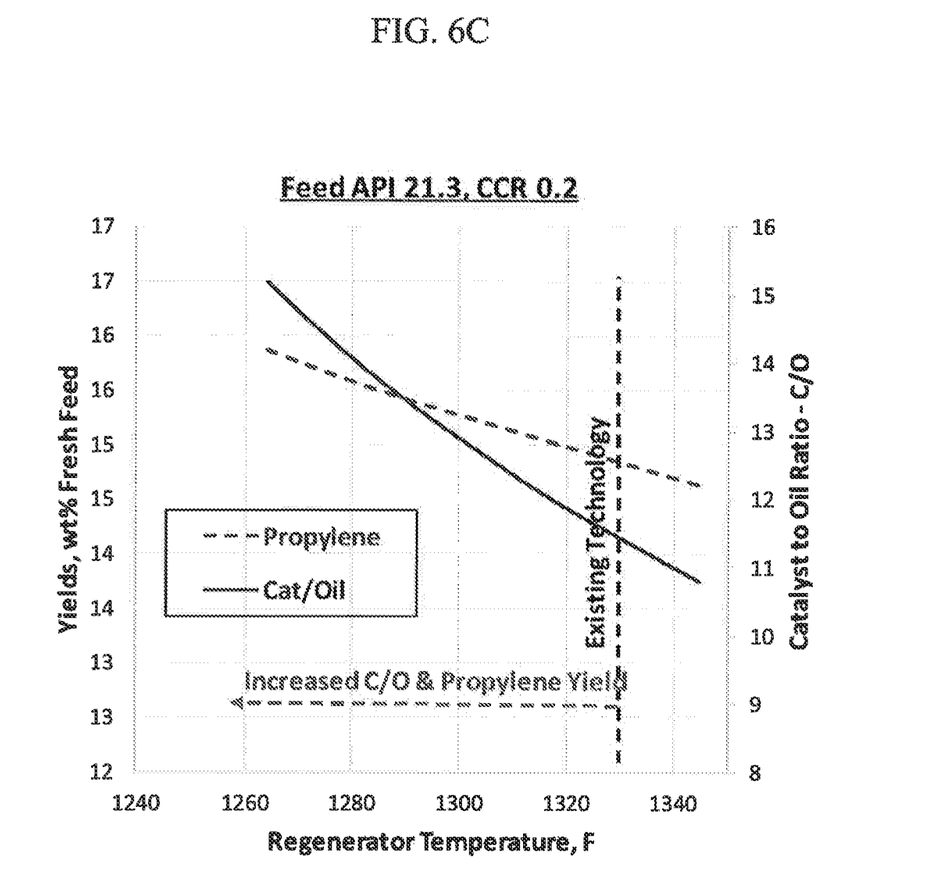
FIG. 6C, is a graphic illustration of the effect of regenerator temperature on Catalyst/Oil ratio and propylene yield for feed having an API of 21.3 and a CCR of 0.2.

FIGS. 6A, 6B and 6C graphically illustrate three examples of the presently claimed processes based on three different feedstocks ranging from light to heavy. As discussed, the disclosed process provides the flexibility to control the regenerated catalyst temperature as well as attain lowest possible overall temperature, resulting in highest possible catalyst to oil ratio required to maximize olefins, specifically propylene, compared to prior technology. The examples illustrate an effect of reducing the overall regenerator temperature on overall catalyst circulation, i.e. catalyst to oil ratio and propylene yields. The graphs in FIGS. 6A-6C shows increase in catalyst circulation and propylene yields as the overall temperature reduces in reference to where existing FCC technologies are operating compare to the present processes.

The above description and examples are merely illustrative of the invention and should not be construed as limiting the scope of the invention. Various modifications will become apparent to the skilled artisan in view of the foregoing disclosure. It is intended that all such modifications coming within the scope and spirit of the appended claims should be embraced thereby.

What is claimed is:

1. A method for increasing olefin production from a hydrocarbon feed, said method comprises:
   delivering from a multi-stage catalyst regenerator a fully-regenerated catalyst from at least one catalyst full regeneration zone to a primary riser reactor;
   cracking the hydrocarbon feed in the primary riser reactor to produce a first cracked product, and spent catalyst;
   flowing the first cracked product and the spent catalyst from the primary riser reactor to a bed cracking reaction zone atop the primary riser reactor, wherein the bed cracking reaction zone is in fluid communication with the primary riser reactor through a distributor;
   further cracking the first cracked product in the bed cracking reaction zone to produce a second cracked product including olefins;
   separating the first cracked product and the second cracked product including olefins from the spent catalyst in a reactor vessel comprising the bed cracking reaction zone, wherein an outer perimeter of the bed cracking reaction zone is defined by a side wall of the reactor vessel radially outward of the primary riser reactor such that the primary riser reactor is within the outer perimeter if the bed cracking zone;
   recovering the first cracked product and second cracked product including olefins; and
   passing the spent catalyst from the reactor vessel to the multi-stage catalyst regenerator comprising the at least one catalyst full regeneration zone and at least one catalyst partial-regeneration zone,
   wherein the spent catalyst is partially regenerated in the catalyst partial regeneration zone to provide partially-regenerated catalyst and forwarding the partially-regenerated catalyst to the catalyst full regeneration zone to provide fully regenerated catalyst.

2. The method of claim 1, wherein the multi-stage catalyst regenerator comprises two catalyst regenerator that operate in series or parallel to one another.

3. The method of claim 1, wherein the multi-stage catalyst regenerator comprises internals and/or packing to provide separate catalyst regeneration zones.

4. The method of claim 1, wherein the portion of the partially-regenerated catalyst that is delivered to the catalyst full regeneration zone has a temperature upon delivery that is less than the temperature of the fully-regenerated catalyst that exits the catalyst full regeneration zone.

5. The method of claim 1, wherein the temperature of the portion of the partially-regenerated catalyst that is delivered to the catalyst full regeneration zone ranges from about 1150° F. to about 1300° F.

6. The method of claim 1, wherein the temperature of the fully-regenerated catalyst that exits the catalyst full regeneration zone ranges from about 1250° F. to about 1500° F.

7. The method of claim 1, wherein the hydrocarbon feed is selected from the group consisting of vacuum gas oils, heavy atmospheric gas oil, atmospheric resid, vacuum resid, coker gas oils, visbreaker gas oils, deashalted oils, hydrocracker bottoms, vegetable oils and heavy conversion product issued from biomass, and any combination thereof or hydrotreated counterparts.

8. The method of claim 1, wherein the cracked product of the riser reactor comprises one or more gaseous product streams comprising $C_2$ and lighter, $C_3$ through $C_6$ light olefins and parafins, $C_6$-$C_8$ light FCC gasoline, light cracked naphtha (LCN), intermediate FCC gasoline comprising benzene and $C_8$-$C_9$ hydrocarbons, heavy FCC gasoline comprising $C_9$-$C_{11}$ hydrocarbons and other gasoline boiling range products comprising materials boiling in the range $C_5$ to about 430° F., middle distillate boiling in the range from about 330° F. to about 630° F., and uncracked bottoms boiling range from about 650° F. to about 900° F.

9. The method of claim 1, further comprising cracking a recycle feed in a secondary riser reactor, wherein the recycle feed contains at least one product from the group consisting of $C_4$'s, light FCC gasoline (LCN), light cycle oil (LCO), heavy cycle oil product (HCO) and slurry oil.

10. The method of claim 1, further comprising cracking a recycle feed in a secondary riser reactor, wherein the recycle feed stream includes hydrocarbons from other refinery and petrochemical units.

11. The method of claim 1, further comprising cracking a recycle feed in a secondary riser reactor, wherein the recycle feed stream is coker naphtha.

12. The method of claim 1, wherein the primary riser reactor operates with an outlet temperature of from 840° F. to about 1100° F.

13. The method of claim 1, wherein said spent catalyst is stripped before regeneration.

14. The method of claim 1, wherein the multi-stage catalyst regenerator comprises internals and/or packing.

15. The method of claim 1, wherein the catalyst partial regeneration zone and the catalyst full regeneration zone provide multi stage regeneration of the catalyst.

16. The method of claim 1, wherein the catalyst full regeneration zone and the catalyst partial regeneration zone are in a single regenerator vessel.

17. The method of claim 1, further comprising feeding at least one of the fully-regenerated catalyst or the partially-regenerated catalyst into a the primary riser reactor, via withdraw well.

18. The method of claim 1, wherein the distributor is disposed within the bed cracking reaction zone above an outlet of the primary riser reactor to form a separation between the primary riser reactor and the bed cracking reaction zone.

19. A method for increasing olefin production from a hydrocarbon feed, said method comprises:
   delivering from a multi-stage catalyst regenerator a fully-regenerated catalyst from at least one catalyst full regeneration zone to in a primary riser reactor defining a first reaction zone;
   cracking the hydrocarbon feed in the primary riser reactor to produce a first cracked product, and spent catalyst;
   flowing the first cracked product and the spent catalyst from the primary riser reactor to a bed cracking reaction zone, defining a second reaction zone, atop the primary riser reactor, wherein the bed cracking reaction zone is in fluid communication with the primary riser reactor through a distributor, the distributor separating the first reaction zone and the second reaction zone;
   further cracking the first cracked product while flowing upwards in the bed cracking reaction zone having additional multi-stage catalyst to produce a second cracked product including olefins;

separating the first cracked product and the second cracked product including olefins from the spent catalyst in a reactor vessel comprising the bed cracking reaction zone having an interface between a bed level and a dilute phase;

recovering the first cracked product and second cracked product including olefins via vapor passing through the dilute phase above the bed cracking reaction zone; and passing the spent catalyst from the reactor vessel down to the multi-stage catalyst regenerator through a stripper section, the multistage catalyst regenerator comprising the at least one catalyst full regeneration zone and at least one catalyst partial-regeneration zone, wherein the spent catalyst is partially regenerated in the catalyst partial regeneration zone to provide partially-regenerated catalyst and forwarding the partially-regenerated catalyst to the catalyst full regeneration zone to provide fully regenerated catalyst.

20. The method of claim 19, wherein further cracking the first cracked product in the bed cracking reaction zone having additional multi-stage catalyst to produce a second cracked product including olefins, further comprises, increasing a residence time of first cracked product vapors within a catalyst bed of the reaction zone and dilute phase of the reactor vessel to boost production of the second cracked product including maximizing olefins prior to separating the first cracked product and the second cracked product from the spent catalyst.

* * * * *